(12) United States Patent
Berlier et al.

(10) Patent No.: US 11,829,117 B2
(45) Date of Patent: Nov. 28, 2023

(54) SYSTEMS AND METHODS FOR RECEIVING SENSOR DATA FOR AN OPERATING ADDITIVE MANUFACTURING MACHINE AND ADAPTIVELY COMPRESSING THE SENSOR DATA BASED ON PROCESS DATA WHICH CONTROLS THE OPERATION OF THE MACHINE

(71) Applicant: General Electric Company, Schenectady, NY (US)

(72) Inventors: Jacob Berlier, Niskayuna, NY (US); Adam McCann, Niskayuna, NY (US); Li Zhang, Niskayuna, NY (US); Brandon Good, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 756 days.

(21) Appl. No.: 16/827,264

(22) Filed: Mar. 23, 2020

(65) Prior Publication Data

US 2020/0285218 A1 Sep. 10, 2020

Related U.S. Application Data

(63) Continuation of application No. 15/608,536, filed on May 30, 2017, now Pat. No. 10,635,085.

(51) Int. Cl.
*G05B 19/4097* (2006.01)
*B23K 26/342* (2014.01)
(Continued)

(52) U.S. Cl.
CPC ........ *G05B 19/4097* (2013.01); *B23K 26/342* (2015.10); *B33Y 50/00* (2014.12);
(Continued)

(58) Field of Classification Search
CPC ...... G05B 19/4097; G05B 2219/49007; G05B 2219/35134; B23K 26/342; B33Y 50/00; B33Y 10/00
See application file for complete search history.

(56) References Cited

U.S. PATENT DOCUMENTS 5,974,862 A 11/1999 Lander et al.
10,635,085 B2 4/2020 Berlier et al.
(Continued)

FOREIGN PATENT DOCUMENTS

WO 2016/068895 A1 5/2016

OTHER PUBLICATIONS

Grambow et al., "Chapter 8: Context-Aware and Process-Centric Knowledge Provisioning: An Example from the Software Development Domain," Institute for Databases and Information Systems, Ulm University; Computer Science Department, Aalen University, Germany, 2016, pp. 179-209, 31 pages.
(Continued)

*Primary Examiner* — Christopher E. Everett
*Assistant Examiner* — Marzia T Monty
(74) *Attorney, Agent, or Firm* — HANLEY, FLIGHT & ZIMMERMAN, LLC

(57) ABSTRACT

Method, and corresponding system, for receiving and adaptively compressing sensor data for an operating manufacturing machine. The method includes determining the sensor data values at the working tool positions based on a time correlation of the values of the sensor data relative to time and the working tool positions relative to time. Tool control magnitude values relative to the working tool positions are determined based on the process data. The method further includes determining a magnitude differential, relative to the working tool positions, between the sensor data values and the tool control magnitude values. Scoring data is deter-
(Continued)

mined by applying a scoring function to the magnitude differential. The magnitude differential data is compressed based at least in part on the scoring data. The method further includes decompressing the magnitude differential data and determining the sensor data values versus the working tool positions based on the magnitude differential data.

14 Claims, 11 Drawing Sheets

(51) Int. Cl.
  *B33Y 50/00* (2015.01)
  *B33Y 50/02* (2015.01)
  *B33Y 10/00* (2015.01)

(52) U.S. Cl.
  CPC .............. *B33Y 50/02* (2014.12); *B33Y 10/00* (2014.12); *G05B 2219/35134* (2013.01); *G05B 2219/49007* (2013.01)

(56) References Cited

U.S. PATENT DOCUMENTS

| | | | |
|---|---|---|---|
| 2009/0062930 A1 | 3/2009 | Aureli | |
| 2009/0210783 A1 | 8/2009 | Bellessort | |
| 2011/0316978 A1 | 12/2011 | Dillon et al. | |
| 2012/0262303 A1* | 10/2012 | Fahey | A61B 5/14552 340/870.02 |
| 2013/0211870 A1 | 8/2013 | Lawson et al. | |
| 2013/0212420 A1 | 8/2013 | Lawson et al. | |
| 2014/0052415 A1 | 2/2014 | Baran et al. | |
| 2014/0091953 A1* | 4/2014 | Scott | H03M 7/4006 341/87 |
| 2014/0337429 A1 | 11/2014 | Asenjo et al. | |
| 2015/0165681 A1 | 6/2015 | Fish et al. | |
| 2015/0294577 A1 | 10/2015 | Kullok et al. | |
| 2015/0294585 A1 | 10/2015 | Kullok et al. | |
| 2017/0129052 A1 | 5/2017 | Buller et al. | |
| 2018/0341248 A1* | 11/2018 | Mehr | G05B 19/4099 |
| 2018/0348734 A1 | 12/2018 | Berlier et al. | |
| 2018/0370144 A1 | 12/2018 | Revanur et al. | |

OTHER PUBLICATIONS

Hedberg, Jr. et al., "Identified research directions for using manufacturing knowledge earlier in the product life cycle," International Journal of Production Research, Jan. 5, 2016, pp. 1-9, 9 pages.

Williams, "Five smart manufacturing hurdles to overcome," Plant Engineering, Jun. 23, 2016, 2 pages.

United States Patent and Trademark Office, "Notice of Allowance," issued in connection with U.S. Appl. No. 15/608,536, dated Dec. 27, 2019, 5 pages.

United States Patent and Trademark Office, "Non-Final Office Action," issued in connection with U.S. Appl. No. 15/608,536, dated Aug. 23, 2019, 50 pages.

* cited by examiner

SYSTEMS AND METHODS FOR RECEIVING SENSOR DATA FOR AN OPERATING ADDITIVE MANUFACTURING MACHINE AND ADAPTIVELY COMPRESSING THE SENSOR DATA BASED ON PROCESS DATA WHICH CONTROLS THE OPERATION OF THE MACHINE

FIELD OF THE INVENTION

Exemplary embodiments described herein relate to receiving sensor data for an operating additive manufacturing machine and adaptively compressing the sensor data based on process data which controls the operation of the machine.

BACKGROUND

The term "additive manufacturing" refers to processes used to synthesize three-dimensional objects in which successive layers of material are formed by an additive manufacturing machine under computer control to create an object using digital model data from a 3D model. One example of additive manufacturing is direct metal laser sintering (DMLS), which uses a laser fired into a bed of powdered metal, with the laser being aimed automatically at points in space defined by a 3D model, thereby melting the material together to create a solid structure. The term "direct metal laser melting" (DMLM) may more accurately reflect the nature of this process since it typically achieves a fully developed, homogenous melt pool and fully dense bulk upon solidification. The nature of the rapid, localized heating and cooling of the melted material enables near-forged material properties, after any necessary heat treatment is applied.

The DMLS process uses a 3D computer-aided design (CAD) model of the object to be manufactured, whereby a CAD model data file is created and sent to the fabrication facility. A technician may work with the 3D model to properly orient the geometry for part building and may add supporting structures to the design, as necessary. Once this "build file" has been completed, it is "sliced" into layers of the proper thickness for the particular DMLS fabrication machine and downloaded to the machine to allow the build to begin. The DMLS machine uses, e.g., a 200 W Yb-fiber optic laser. Inside the build chamber area, there is a material dispensing platform and a build platform along with a recoater blade used to move new powder over the build platform. The metal powder is fused into a solid part by melting it locally using the focused laser beam. In this manner, parts are built up additively layer by layer—typically using layers 20 micrometers thick. This process allows for highly complex geometries to be created directly from the 3D CAD data, automatically and without any tooling. DMLS produces parts with high accuracy and detail resolution, good surface quality, and excellent mechanical properties.

Defects, such as subsurface porosity, can occur in DMLM processes due to various machine, programming, environment, and process parameters. For example, deficiencies in machine calibration of mirror positions and laser focus can result in bulk-fill laser passes not intersecting edge-outline passes. Such deficiencies can result in unfused powder near the surface of the component, which may break through the surface to cause defects which cannot be healed by heat treatment finishing processes. Another subsurface effect of deficiencies in calibration and machine programming is excessive dwelling at the turnaround points in raster scanning. Such dwell can result in excessive laser time (i.e., laser focus time) on a given volume, which may result in "keyholing" and subsurface porosity. Laser and optics degradation, filtration, and other typical laser welding effects can also significantly impact process quality, particularly when operating for dozens or hundreds of hours per build. Furthermore, the DMLM process has thermal shrink and distortion effects which may require CAD model corrections to bring part dimensions within tolerance.

To reduce such defects, process models could be used to predict local geometric thermal cycles during the DMLM process, thereby predicting material structure (e.g., grain) and material properties. Models could also be used to predict shrink and distortion, which would enable virtual iteration prior to the actual DMLM process. Furthermore, predictive models could be used to generate a compensated DMLM model to drive the additive manufacturing machine while accounting for such shrinkage and distortion.

Conventional models relating build parameters to expected melt pool characteristics can be incomplete and/or inaccurate because of shortcomings in the collection and use of data from sensors monitoring the manufacturing process. Many of these shortcomings arise because conventional manufacturing sensor configurations produce "context-less" data, i.e., data which does not have a frame of reference other than time of measurement. Consequently, captured manufacturing sensor data is not in a useful context for design teams to analyze. Another shortcoming of conventional manufacturing sensor configurations is that the sensors monitoring a DMLM process may produce unmanageable quantities of data. For example, a pyrometer monitoring a build may have a data acquisition rate of 50 kHz, which means that a tremendous quantity of data is produced over a build, which can last, e.g., from about a few hours to about 30 days or more. The size of the data file may increase during the build at a rate of about 2 GB per hour or more.

SUMMARY

Disclosed embodiments provide context-aware data which can lead to meaningful analytics of manufacturing processes which, in turn, can provide insights into design changes to improve such processes. Disclosed embodiments contextualize sensor data by linking it to manufacturing data during the build process. This contextual linkage informs the development and refinement of "digital twin" models and analytics to provide insights back to design and engineering to complete the physical-digital feedback loop. Manufacturing and sensor data which are "contextualized" in this manner result in higher fidelity digital twin models for parts.

Disclosed embodiments allow for consistent build quality and anomaly detection in DMLM printing through control and diagnostics of melt pool characteristics. Data may be tagged by geometry so that melt pool characteristics can be viewed and queried according to layer and scanning pattern. A "part genealogy" may be provided so that environmental conditions are captured when depositing an individual layer. The knowledge of experienced operators, who may engage in "rounding" by sense of look, listen, and smell, may be effectively captured and digitized. Support may be provided for "debugging" tools to analyze production failures in real-time. A benchmark standard may be provided to allow part-to-part, build-to-build, and machine-to-machine comparison so that build and design tools are no longer in separate "silos." In-process analysis tools may be provided to avoid relying solely on post-build tools.

Disclosed embodiments enable design of experiment (DoE) based on contextualized data to improve product quality (e.g., part life, finish, etc.) and reproducibility. Insights may be developed regarding how parts are built to inform future design and modeling processes for computer-aided design and manufacturing (CAD/CAM). Such informed process changes help to optimize production effectiveness and reduce cost. Also, key machine performance characteristics may be captured to achieve individualized CAM.

Disclosed embodiments allow for compression of output data from an additive manufacturing machine (e.g., DMLM printing machine) as close to the machine as possible. In disclosed embodiments, output data is compressed by comparing a sensor output signal, e.g., a pyrometer output signal with an expected magnitude profile. The expected magnitude profile may be determined from the geometry of the laser scan path, which may be obtained from a data file containing instructions for moving and activating the laser. The output data may be compressed, i.e., the quantity of output data may be reduced, by storing only values of the output data which vary from the expected magnitude profile. The computing and storing of the compressed output data may be done by a device which is physically close to the printer so that large quantities of data need not be transmitted via a network.

In one aspect, the disclosed embodiments provide a method, and corresponding system, for receiving and adaptively compressing sensor data for an operating manufacturing machine. The method includes receiving, at a first server, the sensor data from a sensor for the operating machine. Values of the sensor data relative to time are determined using a processor of the first server. The method further includes determining, using the processor of the first server, working tool positions relative to time based on process data which controls operation of the manufacturing machine. The process data includes vectors defining the working tool positions, and corresponding magnitude values. The method further includes determining, using the processor of the first server, the sensor data values at the working tool positions based on a correlation of the values of the sensor data relative to time and the working tool positions relative to time. Magnitude values relative to the working tool positions are determined based on the process data using the processor of the first server. The method further includes determining a magnitude differential, relative to the working tool positions, between the sensor data values and the magnitude values. Scoring data is determined by applying a scoring function to the magnitude differential. The magnitude differential data is compressed based at least in part on the scoring data. The magnitude differential data is transmitted via a network.

In disclosed embodiments, the method may include one or more of the following features.

After the determining of the sensor data values at the working tool positions, the following steps may be performed. Scoring data values relative to the working tool positions may be determined based at least in part on an identification of geometric structures in the process data. The sensor data may be compressed based at least in part on the scoring data.

The method may further include decompressing the magnitude differential data and determining the sensor data values versus the working tool positions based at least in part on the magnitude differential data. The method may further include outputting the sensor data values at the working tool positions to an analytic model of the additive manufacturing machine. Adjusted process data may be received from the analytic model of the additive manufacturing machine. The adjusted process data may be determined based at least in part on the analytic model and the sensor data values at the working tool positions, the analytic model being based at least in part on a measured characteristic of the additive manufacturing machine. The adjusted process data may be used to control the operation of the additive manufacturing machine.

The method further includes correlating, using a processor of a user interface device, a 3D model of the part with the sensor data values at the working tool positions. The method further includes displaying, on a display of the user interface device, the 3D model of the part with a representation of the sensor data values at the working tool positions.

The scoring data may be binary, indicating inclusion or exclusion of each corresponding value of the magnitude differential data. The compressing of the magnitude differential data may include removing magnitude differential data values indicated for exclusion by the scoring data. Each value of the scoring data may have one of three or more possible states, each of the states being indicative of a defined magnitude range of the magnitude differential, a corresponding value of the magnitude differential data being within the indicated magnitude range. The compressing of the magnitude differential data may be based at least in part on the scoring data. The compressing of the magnitude differential data may use Chebyshev polynomials, a number of coefficients of the polynomials being determined based at least in part on the scoring data.

The magnitude differential data may be transmitted to a second server, the second server being configured to make the magnitude differential data available to a user interface device. The user interface device may retrieve the magnitude differential data from the second server. The determining of the sensor data values versus the working tool positions may include determining the magnitude values versus the working tool positions from process data of the machine stored in at least one of the data host/server and the user interface device.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

DETAILED DESCRIPTION

In disclosed embodiments, the measured data output by a sensor, e.g., a pyrometer, is fed through a model which produces the expected measurement results. Before starting the manufacturing process, a machine, e.g., a direct metal laser melting (DMLM) printer, is provided with process data, which includes the geometry of the part being printed, a defined laser scan path, and tool control magnitude values (e.g., laser intensity settings). This process data can be used to produce an expected magnitude profile. Thus, the system has expected magnitude values which are derived from laser power settings in the process data (and possibly a model offset value). These values are compared to the measured pyrometer signal on a mark-by-mark basis, i.e., at specific laser positions at which the laser is activated. Based on this comparison, it is possible, for example, to store only the unexpected results, which significantly reduces the amount of data which needs to be transmitted. In this way, data can be stored for laser positions near detailed features, such as corners and overhangs, which may result in large differentials between the expected and measured characteristics. On the other hand, data need not be stored for laser positions near "bulk" features (i.e., features which are not finely detailed), which as a practical matter may be a significant portion of the laser positions.

In disclosed embodiments, the compression is effected through a modular configuration in which: (1) a differential between actual measurements and expected measurements is computed and scored, i.e., evaluated; and (2) a compression algorithm is adapted, based on the scored differential. In a typical case, the expected magnitude profile, based on laser power settings in the process data, form a square wave with respect to time, starting at a laser turn-on time and ending at a laser turn-off time. Likewise, the measured magnitude, e.g., obtained from pyrometry readings of the energy of the melt pool, forms a corresponding square wave which will be similar in shape to the expected magnitude but may have variations from the expected magnitude. The variations from the expected magnitude profile, i.e., the differential between the measured and expected magnitude profiles, may be determined in various ways, such as, subtracting one data stream from the other, performing a convolution/cross-correlation, etc. The differential between the measured and expected magnitude profiles is then evaluated using an algorithm, such as a scoring algorithm which, in effect, converts the differential into a parameter for tuning, i.e., controlling, an adaptive compression algorithm which is used to compress the differential data stream.

Figure 1:
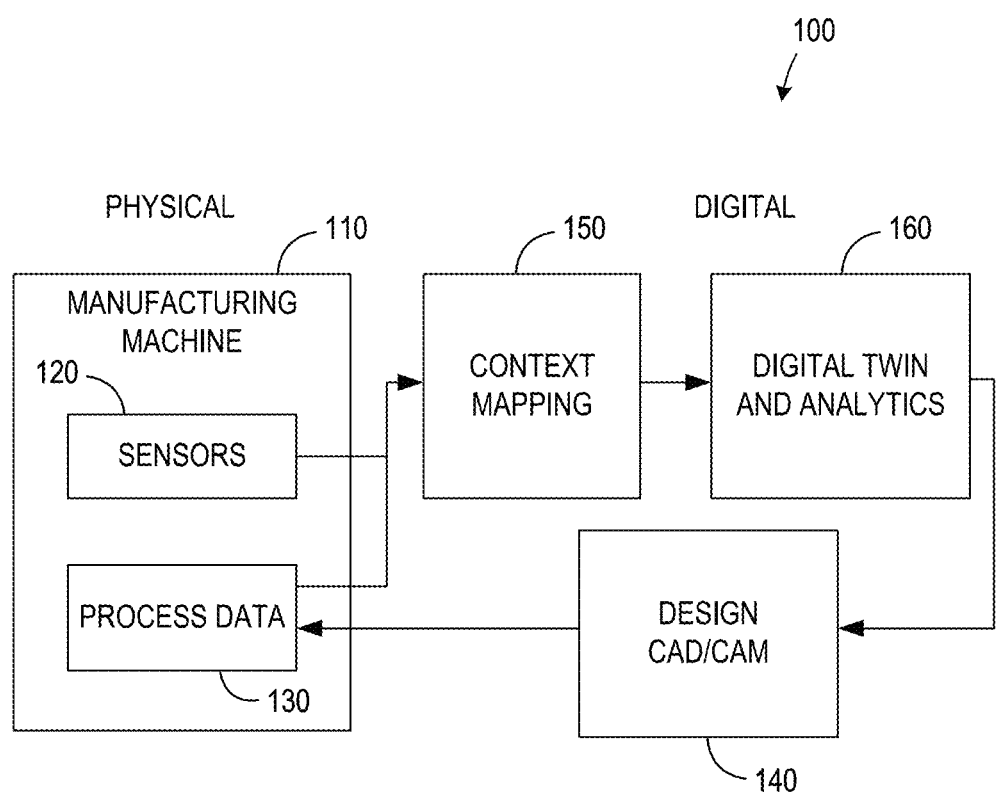
FIG. 1 is a block diagram of an embodiment of a system for receiving sensor data for an operating additive manufacturing machine and mapping the sensor data with process data which controls the operation of the machine.

FIG. 1 depicts a system 100 for receiving sensor data for an operating manufacturing machine 110 (e.g., sensor output which is sampled and digitized) and mapping the sensor data 120 with process data 130 which controls the operation of the manufacturing machine 110. The manufacturing machine 110 is computer controlled, e.g., by an internal processor having associated software which interacts with the various components of the machine 110. The software includes process data 130 which provides instructions for the machine 110 to fabricate a particular part. Such instructions may, for example, control the position, movement, and power setting of a laser in an additive manufacturing machine. The process data 130, in such a case, defines a path for the laser for each layer of a part. The process data 130 can be changed, as necessary, to modify the manufacturing process to refine the physical characteristics of a manufactured part or to produce a different part. In a typical case, the process data 130 is downloaded from a design facility 140, e.g., a computer-aided design and computer aided manufacturing (CAD/CAM) facility, and stored on the manufacturing machine 110.

The manufacturing machine 110 has a number of sensors 120 which monitor various aspects of the manufacturing process. These may include sensors 120 which measure the physical characteristics of a part being manufactured or worked on by the machine 110, such as, for example, temperature, pressure, acceleration, etc. It may also be desirable to have sensors 120 which are separately installed in or near the machine 110 to measure additional physical characteristics, e.g., a pyrometer to measure temperature during operation of an additive manufacturing machine. Typically, the sensors 120 continuously output data during the manufacturing cycle, e.g., build time, of a part. For purposes of discussion, the native sensors of the machine, as well as any separately installed sensors 120 which are monitoring the machine 110 (and/or the part being manufactured by the machine), are considered to result in "sensor data for the machine." In disclosed embodiments, the sensor data 120 may come directly from the machine 110 and also may come from separately installed sensors 120 (in which case the sensor output is sampled and digitized to produce the sensor data).

In disclosed embodiments, a context mapping 150 of the sensor data 120 is performed which correlates the sensor data 120 with the process data 130. In the resulting contextualized data, the various sensor 120 readings are associated with the instructions in the process data 130 based on a time reference, i.e., time correlation. Thus, for example, a sensor output measuring the temperature of the build plate in an additive manufacturing machine can be aligned with specific directional and velocity instructions for the laser in the process data. This allows engineering and design teams to analyze data in the context of what was happening in the manufacturing process, rather than merely in the context of when the sensor measurement was taken. Therefore, for example, changes can be made to the machine configuration to produce a desired build plate temperature for a particular laser path.

In disclosed embodiments, the system 100 may be used to provide models in association with a machine learning framework, for example, a "digital twin" 160 of a twinned physical system (e.g., the manufacturing machine 110). A digital twin 160 may be a high fidelity, digital replica or dynamic model of an asset (e.g., an additive manufacturing machine) or process, used to continuously gather data and increase insights, thereby helping to manage industrial assets at scale. A digital twin 160 may leverage contextual data from the sensors 120 to represent near real-time status and operational conditions of an asset (e.g., the manufacturing machine 110) or process. A digital twin may estimate a remaining useful life of a twinned physical system using sensors, communications, modeling, history, and computation. It may provide an answer in a time frame that is useful, i.e., meaningfully prior to a projected occurrence of a failure event or suboptimal operation. It might comprise a code object with parameters and dimensions of its physical twin's parameters and dimensions that provide measured values, and keeps the values of those parameters and dimensions current by receiving and updating values via contextual data from the sensors associated with the physical twin. The digital twin may comprise a real time efficiency and life consumption state estimation device. It may comprise a specific, or "per asset," portfolio of system models and asset-specific sensors. It may receive inspection and/or operational data and track a single specific asset over its lifetime with observed data and calculated state changes. Some digital twin models may include a functional or mathematical form that is the same for like asset systems, but will have tracked parameters and state variables that are specific to each individual asset system. The sophisticated insights gained from analysis of contextual data and use of a digital twin 160 can be passed on to design and engineering elements 140 to allow for design changes to improve the part or the manufacturing process (e.g., the efficiency of the process).

Figure 2:
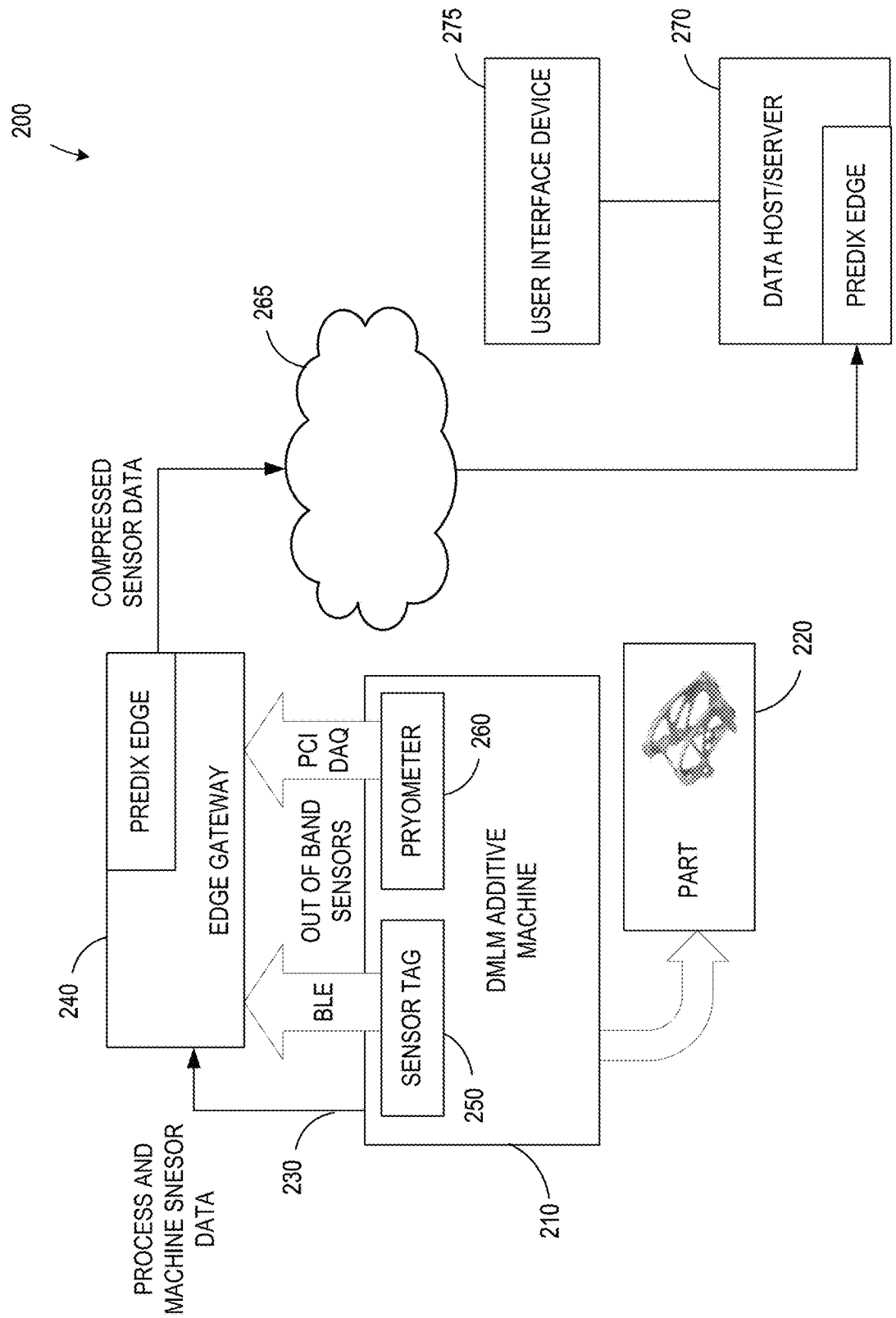
FIG. 2 is a block diagram of an embodiment of a system for receiving sensor data for an operating direct metal laser melting (DMLM) machine and mapping the sensor data with process data.

FIG. 2 depicts an embodiment of a system 200 for receiving sensor data for an operating direct metal laser melting (DMLM) additive manufacturing machine 210 (including sensor output from separately installed sensors, which is sampled and digitized) and mapping the sensor data with the process data. The operation of the machine 210 as it fabricates a part 220 is monitored by internal sensors of the machine, such as, for example, acceleration of the laser, humidity, ambient temperature, and "downbeam" images and video. The output of these sensors may be communicated through the control and monitoring channels 230 of the machine to a network computing and communication device, such as, for example, an edge gateway server 240. Additional sensors may be installed at the DMLM machine 210 to provide measurement data for parameters not measured by the native sensors of the machine 210. For example, a sensor tag 250 attached to and/or associated with the part being manufactured may provide data wirelessly, e.g., a tag which measures the presence of particular gasses. As a further example, a pyrometer 260 may be installed at the additive manufacturing machine 210 to measure surface temperatures on a part 220 being manufactured and, in particular, the energy of specific portions of the melt pool. This measurement may serve, in effect, as a proxy for the intensity of the laser power which has reached the specific portion of the melt pool. The output from these additional sensors may be transmitted via separate channels (i.e., "out of band") relative to the native sensors of the additive manufacturing machine, e.g., the sensor tag 250 data may be transmitted via a direct Bluetooth low energy (BLE) connection to the edge gateway and the pyrometer 260 data may be transmitted via a direct peripheral component interconnect bus data acquisition (PCI DAQ).

As discussed in further detail below, the edge gateway 240 may receive sensor output data from one or more additive manufacturing machines 210 and performs a context mapping (see, e.g., FIG. 1) with the process data which is used to control the one or more machines 210. The process data for each machine 210 may be sent to the edge gateway via a control and monitoring channel 230, i.e., the conventional data communication channel of the machine. Alternatively, the process data for a particular machine may be transmitted from another source, e.g., a design and engineering facility, in advance of the operation of the machine and stored in a memory of the edge gateway. In addition to the context mapping of the sensor output data, the edge gateway 240 filters and/or compresses the sensor data before transmitting it, thereby reducing the large amount of sensor data into a data set that can be practically transmitted via a network 265 (e.g., the internet or another cloud-based network).

The compressed, filtered data is received via the network 265 at a data host/server 270. Both the edge gateway 240 and the data host/server 270 may communicate using Predix™ which has been developed by General Electric to provide cloud computing tools and techniques that provide application management and facilitate communication with industrial machines in distributed locations. In such a case, the edge gateway 240 and the data host/server 270 are equipped with an implementation of Predix Edge, which enables these devices to communicate readily via the cloud-based network 265. The data host/server 270 performs various data storage and management functions. It is connected to a user interface device 275, such as, for example, a computer with a display and input devices. The user interface device 275 provides various ways of displaying and analyzing the data from the data host/server 270.

Figure 3:
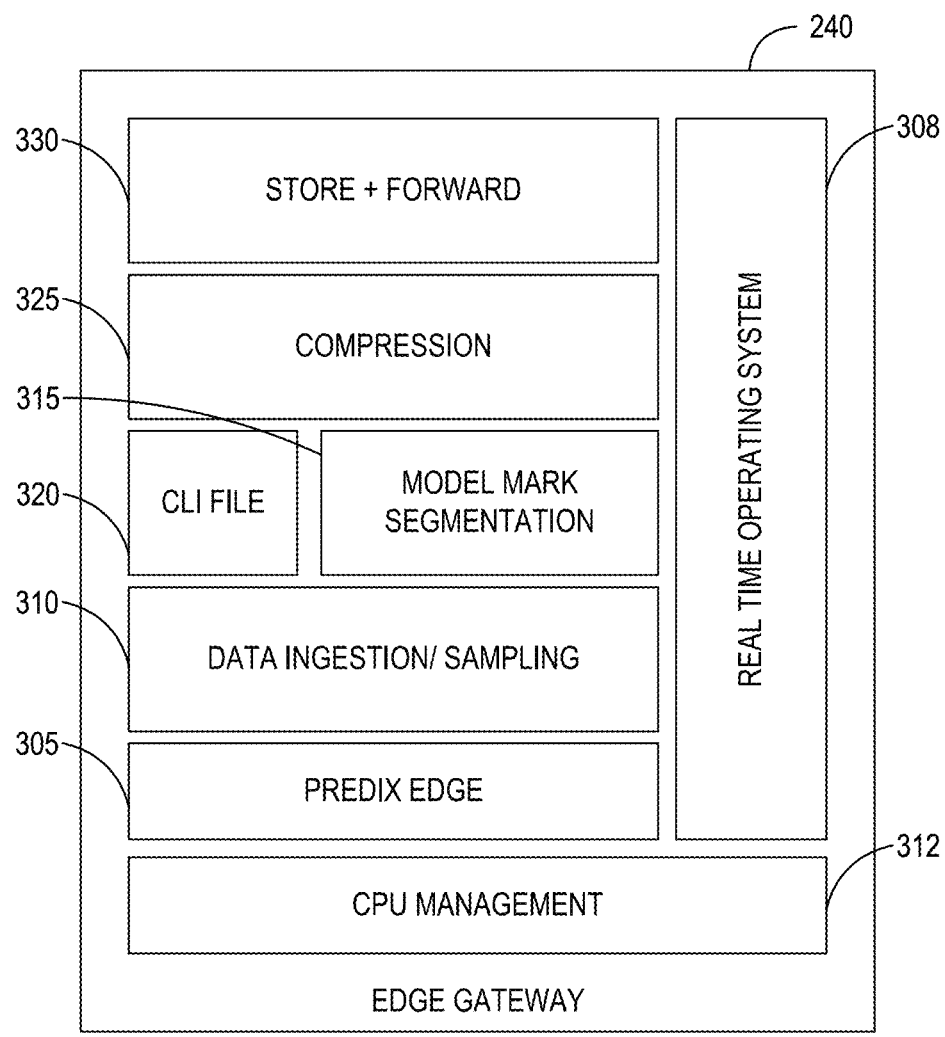
FIG. 3 is a block diagram of an embodiment of an edge gateway for receiving sensor data for a DMLM machine.

FIG. 3 depicts an embodiment of an edge gateway 240 for receiving sensor data for a DMLM machine 210 (see FIG. 2), including sensor output from separately installed sensors, which may be sampled and digitized. Each box represents an app (i.e., software application) which performs particular functions relating to the receiving and processing of sensor data. The boxes defined in this figure represent an embodiment of the edge gateway 240 in which the functions performed by the edge gateway 240 are divided among a specific combination of apps. Other embodiments of the edge gateway 240 may perform similar functions but may divide the functions among a different combination of apps (e.g., a combination in which the functions of two separate apps have been combined into a single app, or vice versa). The apps run on a conventional computer operating system, e.g., Microsoft Windows™ or Linux.

The edge gateway 240 receives data from native sensors of the additive manufacturing machine 210 via the network 230 communication channels which are used for control and monitoring of the machine (see FIG. 2). Such communications may be handled by an implementation of Predix Edge 305 in the edge gateway 240. In addition, there may be a data ingestion and sampling app 310 configured to receive out-of-band communications from additional sensors installed at the machine, such as, for example, a pyrometer. Prior to the data ingestion and sampling app 310, the receiving of the out-of-band communications may be handled by a real-time operating system (RTOS) 308 which is configured to handle the data as it is received in real time. In disclosed embodiments, an RTOS or a field programmable gate array (FPGA) is used to perform raw data acquisition operations in deterministic time before the apps (e.g., the data ingestion and sampling app 310) process the data. For example, some laser systems produce a digital trigger signal that is captured in sync with pyrometry data to provide microsecond accuracy the on/off times of the laser. The data ingestion and sampling app 310 may use specialized adapters to receive the out-of-band data and may provide signal conditioning, sampling at one or more specific rates (e.g., 50 kHz), and analog to digital conversion. The specialized adapters may include an adapter configured to receive Bluetooth low energy (BLE) signals from sensor tags. The edge gateway 240 also may include a central processing unit (CPU) management app 312 to control the use of multiple CPU cores to perform processing tasks more efficiently.

As noted above, the sensor data received from the pyrometer is a measure of the energy of the melt pool but may be considered to be a proxy for the intensity of the laser power that has reached a specific portion of the melt pool. To provide context for the intensity data, the edge gateway 240 maps the intensity data with the position of the laser obtained from process data, taking into account whether the laser is on or off at each position. To perform the mapping, the model mark segmentation app 315 maps the intensity data versus time. The process data relating to laser position and activation is stored in a common layer interface (CLI) file 320 in the form of laser scanning and movement (i.e., "jump") vectors arranged in layers—the laser being on during a scanning vector and off during a jump vector. The CLI file 320 is processed by the model mark segmentation app 315 to produce the position of the laser versus time while the laser is turned on for each layer of the part. The model mark segmentation app 315 correlates intensity and position of the laser to produce a data set for intensity versus position (while the laser is on). The mapped, i.e., correlated, data from the model mark segmentation app 315 is output to a compression app 325 to reduce data transmission requirements and is then sent to a store and forward app 330 where the data is stored in a buffer and forwarded for transmission via the network.

In disclosed embodiments, image and video data may use another measurement, e.g., pyrometry measurements, as a correlation reference, because light received by the imaging equipment will substantially coincide with the two-dimensional path of the activated laser on a particular layer. Alternatively, the process data, e.g., the CLI file, may be used to generate a two-dimensional correlation reference on a layer-by-layer basis. In either case, a two-dimensional correlation may be performed between an image or frame of video and the two-dimensional reference "image" produced by measurements or process data for a particular layer.

Figure 4:
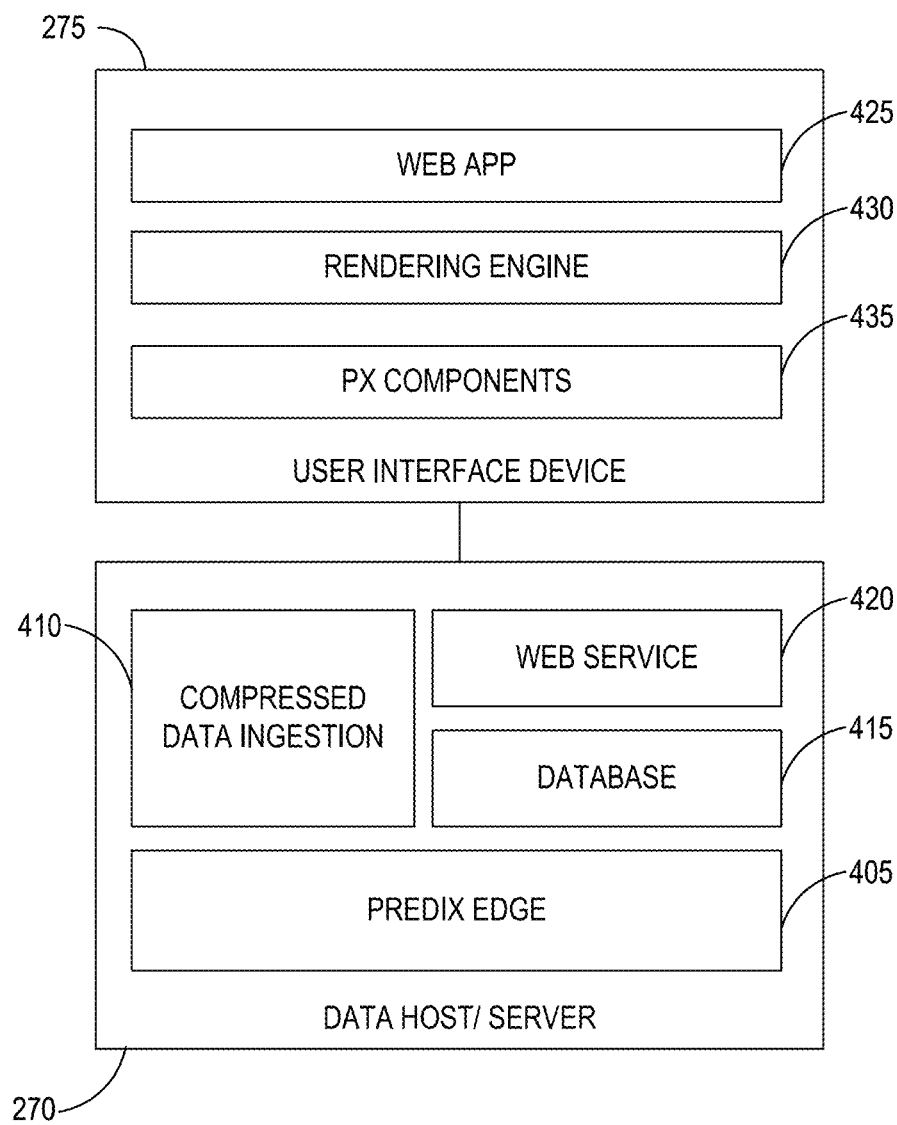
FIG. 4 is a block diagram of an embodiment of a data host/server and user interface device.

FIG. 4 depicts an embodiment of a data host/server 270 and user interface device 275 for receiving and analyzing sensor data from the edge gateway 240, which is connected to the DMLM machine 210 (see FIGS. 2 and 3). The sensor data may be, for example, melt pool energy data based on pyrometer measurements (which may be taken to be a proxy for the intensity of laser power that has reached a specific portion of the melt pool). The data host/server 270 is connected via a network 265 to the edge gateway 240 (see FIG. 2) and may use Predix Edge 405 to facilitate communication and also to manage the apps running on the data host/server. The compressed measured intensity data transmitted by the edge gateway 240 (see FIG. 2) is received at the data host/server 270 by a compressed data ingestion app 410, where it is stored in a database 415. In disclosed embodiments, the ingested data is stored in correspondence with formation layers of the part being manufactured by the additive manufacturing machine. In such a case, the formation layers of the part may have an identifying number which allows data to be stored and retrieved based on a layer number. This allows a user to retrieve a set of measured intensity data for all (x, y) positions in a particular layer in its compressed form. The data is made available by the data host/server 270 via a web service 420 which is accessible by one or more user interface devices through a protocol such as, for example, representational state transfer (REST).

The user interface device 275 provides a web app 425 which accesses the web service 420 of the data host/server 270 to retrieve stored sensor data. The web app 425 may run as a standalone application on the native operating system of the user interface device 275 or it may be accessed via a browser running on the user interface device 275. Through the web app 425, the user may request data from the web service 420, e.g., data for a specific layer, in which case the relevant data is retrieved from the database 415 by the web service 420 and transmitted to the web app 425 on the user interface device 275. In disclosed embodiments, the data for the layer is decompressed by the user interface device 275, rather than by the data host/server 270. The decompression may be performed by the rendering engine 430 (discussed below) or a separate app/module running on the user interface device 275. This configuration allows the data to be sent from the data host/server 270 to a number of user interface devices 275 in compressed form, thereby reducing data communication requirements.

A rendering engine 430 is used to display the data in various formats, such as, for example, a three-dimensional perspective view. The rendering engine 430 may also color code the data so that the sensor data can be more easily visualized. For example, higher levels of measured intensity may be presented in red. The color coding may be applied by the rendering engine 430 to the surfaces of a 3D model of the manufactured part. The 3D model of the part may be stored, e.g., in a 3D CAD stereolithography (STL) file. The user interface device 275 may include Predix components 435 to facilitate the presentation of a graphical user interface.

Figure 5A:
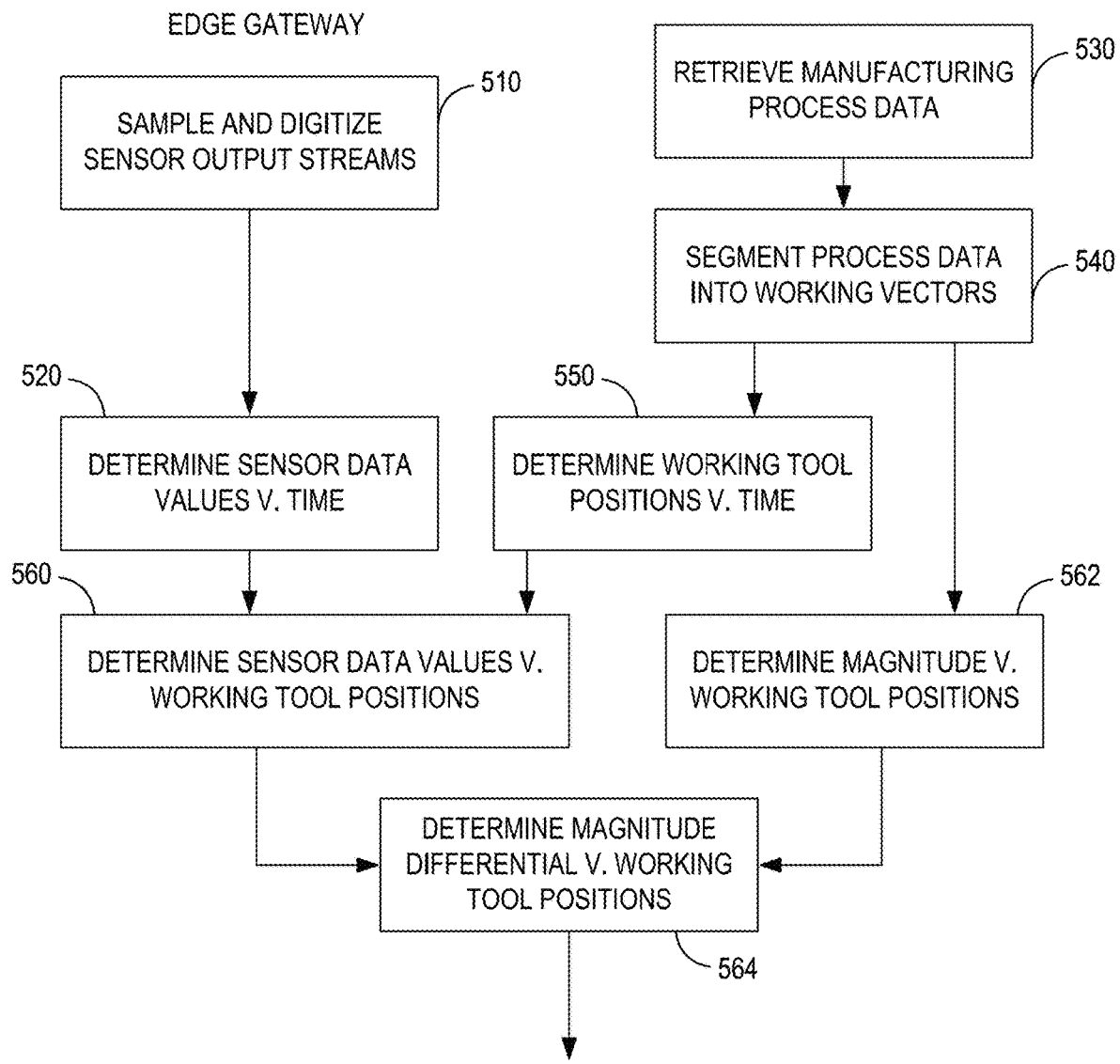
FIGS. 5A-5C present a flowchart of an embodiment of a process for adaptively compressing the sensor data based on a magnitude differential determined from process data of the machine.
Figure 5B:
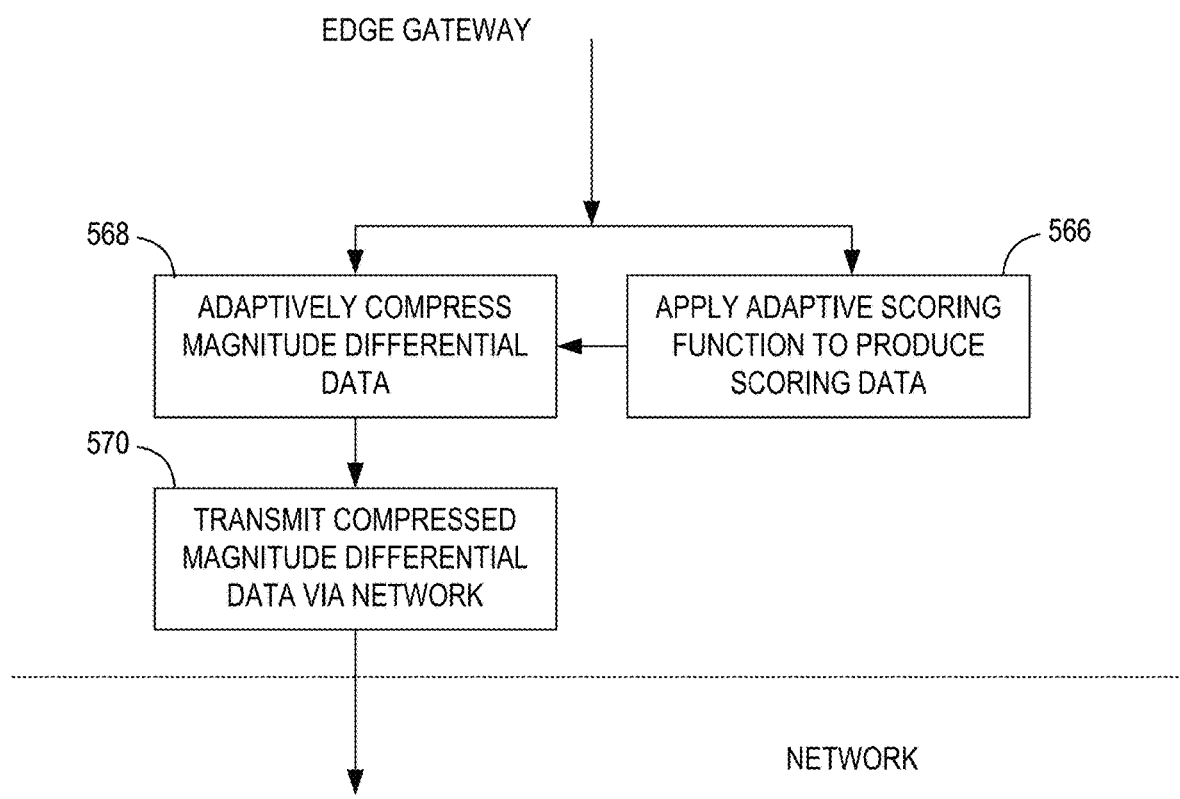
Figure 5C:
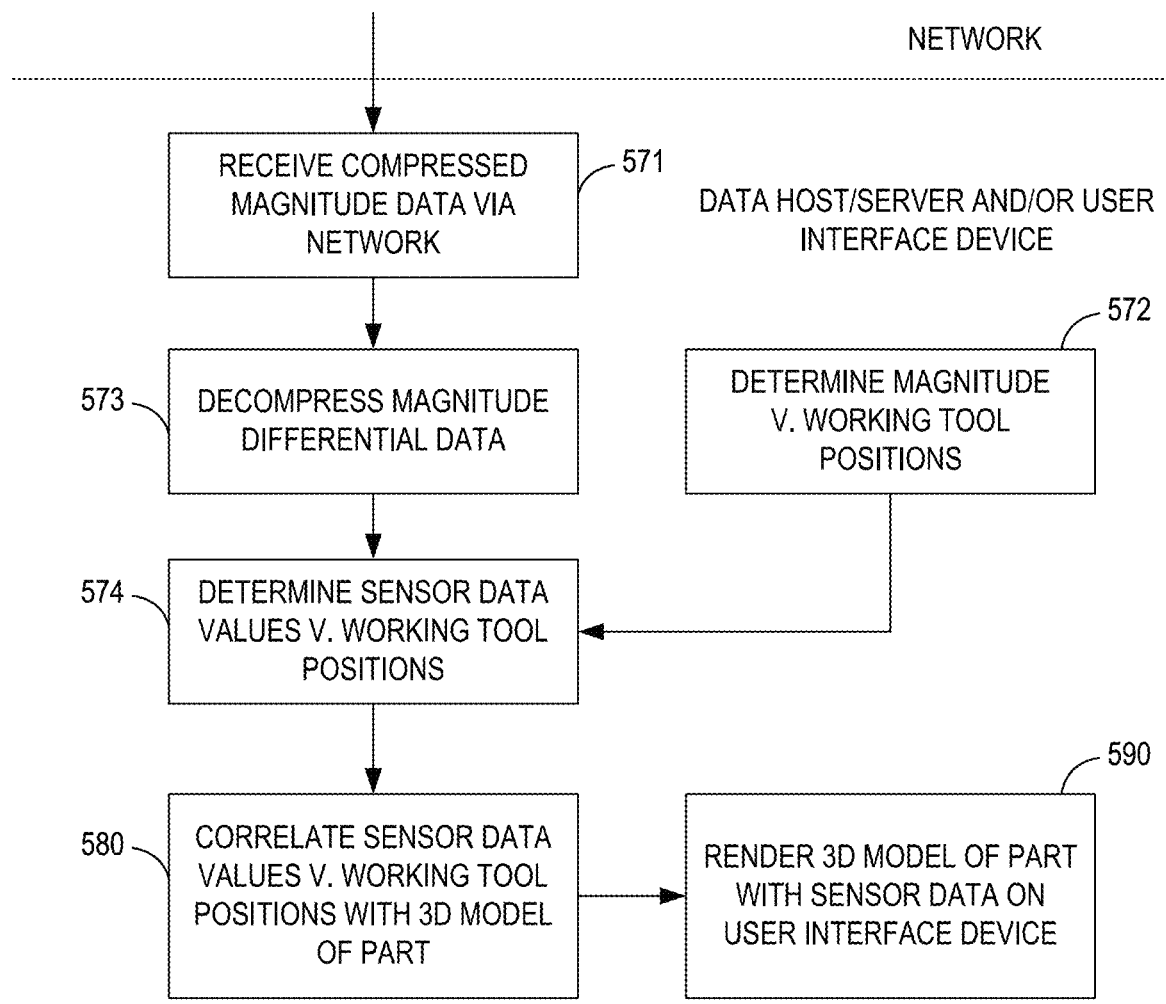

FIGS. 5A-5C depict a flowchart of an embodiment of a process for adaptively compressing the sensor data based on a magnitude (e.g., laser intensity) differential determined from process data of the machine. As shown in FIG. 5A, a sensor output stream, e.g., from a pyrometer, is sampled at a determined frequency (e.g., 50 kHz) and digitized 510. This results in a stream of sensor data values at a known frequency. Therefore, each sensor data value can be associated with a specific time relative to a determined time reference 520.

Manufacturing process data is retrieved to obtain information regarding the path of the tool (e.g., a laser) during manufacture of the part 530. The process data may be in the form of a CLI file, which specifies parameters relating to movement of the tool, such as the tool path (e.g., specified by position coordinate vectors and layer number), tool velocity, etc. The timing of the position of the tool can be computed based on these movement parameters. The data in the CLI file also controls when the tool is on, i.e., scanning or working, versus when it is merely moving from one position to another. A vector which specifies movement while the tool is on may be referred to as a "working vector". The CLI file is segmented, i.e., divided, to separate the working vectors from the non-working vectors on each layer 540. This allows determination of the "working tool position" versus time for each layer, as both the position of the tool (while the tool is on) and the timing of its movement are known 550. The sensor data values versus time and the working tool positions versus time can be time correlated to produce sensor data values versus working tool position 560.

In disclosed embodiments, the time correlation is performed by aligning waveforms of the sensor data values versus time with the working tool positions versus time. Specifically, as the laser switches from an off condition in a non-working vector to an on condition in a subsequent working vector, and vice versa, these binary conditions produce a square wave characteristic. The activation of the laser in the working vectors results in a significant increase in the sensor data values from the pyrometer, followed by a sharp drop in the sensor data values when the laser is switched off in a subsequent non-working vector. Thus, the waveform of the sensor data values is substantially a square wave, except that there is a delay relative to the working vector, and some rounding of the waveform, due to a natural lag between laser activation/deactivation and the pyrometer readings. Nevertheless, the waveforms of the sensor data values can be aligned with corresponding working vectors to effectively achieve a time correlation therebetween. Alternatively, in disclosed embodiments, the time correlation may be performed by stepping through the time data points of the working tool positions versus time data, searching for a close time data point in the sensor data values versus time, and matching the corresponding sensor data value with the corresponding working tool position. Various other algorithms for correlating the data points with respect to time may be used.

The CLI file also specifies parameters relating to the magnitude of the tool control level, e.g., an intensity or power level of the tool. For example, the magnitude may correspond to an intensity setting for a laser tool of a DMLM additive manufacturing machine. The magnitude data from the CLI file, along with the working tool position vectors, can be used to determine magnitude versus working tool position 562, which provides a baseline, i.e., expected, magnitude profile relative to working tool position. The magnitude baseline can be used as a reference and compared to the measured sensor data values to determine a magnitude differential versus working tool position 564. The magnitude differential can be determined according to a number of different algorithms. For example, a difference may be computed by subtracting the baseline magnitude from the sensor data values. As a further example, a convolution, or cross-correlation, of the two data streams may be computed. Various other mathematical functions may be applied to compute a result indicative of a differential between the baseline and measured magnitudes.

As shown in FIG. 5B, the computed magnitude differential is processed by applying an adaptive compression scoring function 566. The scoring function produces an output, i.e., scoring data, which is indicative of relative values of the magnitude differential. The scoring data is then used as a parameter to "tune," i.e., control or adapt, a compression algorithm which is used to adaptively compress the magnitude differential data 568. For example, Chebyshev polynomials may be used to encode the differential data stream. A varying number of coefficients could be used for the polynomials so that the encoding would be more accurate as an increasing number of coefficients are used. The number of coefficients could be determined based on the output of the scoring function. The compressed magnitude differential data is then transmitted via a network 570 from the edge gateway 240 to a data host/server 270 (see FIG. 2).

The adaptive compression need not be a binary algorithm, as described above, in which differential data is either stored or not stored. Rather, in disclosed embodiments, a variably adaptive algorithm may be used. For example, Chebyshev polynomials may be used to encode the differential data stream. A varying number of coefficients could be used for the polynomials so that the encoding would be more accurate as an increasing number of coefficients are used. The number of coefficients could be determined based on the scoring of the differential data stream. For example, measured magnitudes which result in a large differential with respect to the expected magnitudes (i.e., measured magnitudes which are farther from the expected magnitude values) would be encoded using a larger number of Chebyshev coefficients, whereas measured magnitudes which result in a small differential (i.e., measured magnitudes which are closer to the expected magnitude values) would be encoded using a smaller number of coefficients. Thus, measurements which are far from expected values would be rendered with greater accuracy, because they may represent an anomaly which requires fine-grained evaluation.

As shown in FIG. 5C, the magnitude differential data is received via the network 571 by the data host/server 270. The data host/server 270, in turn, makes the magnitude differential data available to the user interface device 275, of which there may be many connected to the data host/server 270. The magnitude differential data can be decompressed using an algorithm which is complementary to the compression algorithm. For example, if Chebyshev polynomials are used to compress the magnitude differential data, then a signal is lossily reproduced by summing the polynomial functions according to the received coefficients. The magnitude differential data may be decompressed 573 by the data host/server 270 or by the user interface device 275, the latter approach having the advantage that the data may be sent from the data host/server 270 to a number of user interface devices 275 in compressed form (see FIG. 2). In the event the user interface device performs the decompression, the magnitude differential may be retrieved from the data host/server 270 by the user interface device 275 using, for example, a web service. The magnitude differential data may be retrieved by the user interface device 275 on a layer-by-layer basis.

As shown in FIG. 5C, process data from the additive manufacturing machine, e.g., from a CLI file, is used to reproduce the measured sensor data values from the magnitude differential data. Specifically, the working tool vectors can be computed from the CLI file and, in turn, the magnitude versus working tool position can be determined 572, in a manner similar to that described above for the compression algorithm (see FIG. 5A, ref nos. 540 and 562). As described above, the magnitude versus working tool position provides a baseline magnitude profile relative to working tool position. The magnitude baseline can be combined with (e.g., added to) the decompressed magnitude differential (versus working tool position) data to reproduce the measured sensor data values versus working tool position 574.

The determination of sensor data values versus working tool position provides a space domain context in which to consider the sensor data values, i.e., the points in 3D space at which each sensor measurement was made. The sensor data values in their space domain context form a "point cloud" of sensor data values at specific points in space which, in turn, can be correlated to the physical structure of the manufactured part, e.g., by using a 3D model of the part 580. For example, measured laser magnitudes can be correlated with the point in 3D space at which they are measured, and this point can be mapped to a corresponding point or element on the surface of the manufactured part. In disclosed embodiments, the mapping is done on a layer-by-layer basis.

A 3D CAD model of the part may be used in the mapping of the measurement points of the sensor data values onto the physical structure of the part because process data files, e.g., CLI files, typically do not include information regarding the physical structure of the part. For example, an STL file may be used as the source of the 3D model of the part. The sensor data values in the point cloud can each be correlated, on a layer-by-layer basis, with the closest corresponding point/element of the 3D model (an STL file defines the physical structure as a shell rather than as a point cloud, so the correlation is not per se point-to-point). The corresponding elements of the 3D model can then be modified to indicate the corresponding sensor data value, e.g., by setting the element of the 3D model to a specific color based on a determined color code. The 3D model with a representation of the sensor data (e.g., represented by a color code) can be rendered, according to layer, on a display of the user interface device using conventional rendering techniques 590. Alternatively, the point cloud of sensor data values could be color coded and separately rendered superimposed on the 3D model on a layer-by-layer basis. In such a case, the point cloud of sensor data values for a particular layer may be aligned as a whole with the corresponding layer of the 3D model, rather than on a point-to-point basis, e.g., by alignment of designated reference points. The rendering and display of the 3D model and sensor data value point cloud is done on a layer-by-layer basis. In disclosed embodiments, the 3D model may be displayed as individual 2D models of each layer, e.g., by presenting a plan view of each layer.

Figure 6A:
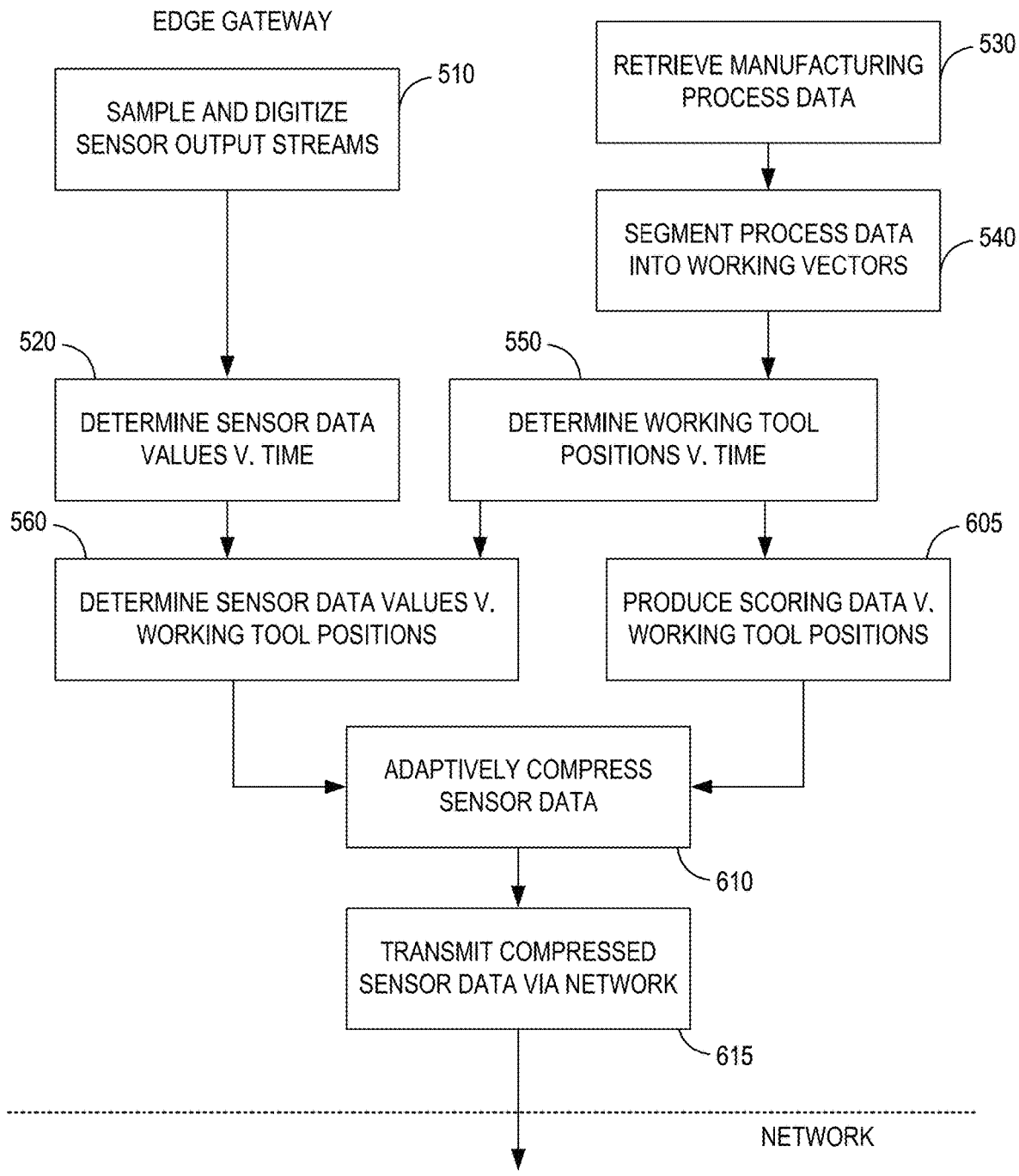
FIGS. 6A and 6B present a flowchart of an alternative embodiment of a process for adaptively compressing the sensor data based on a magnitude differential determined from process data of the machine.
Figure 6B:
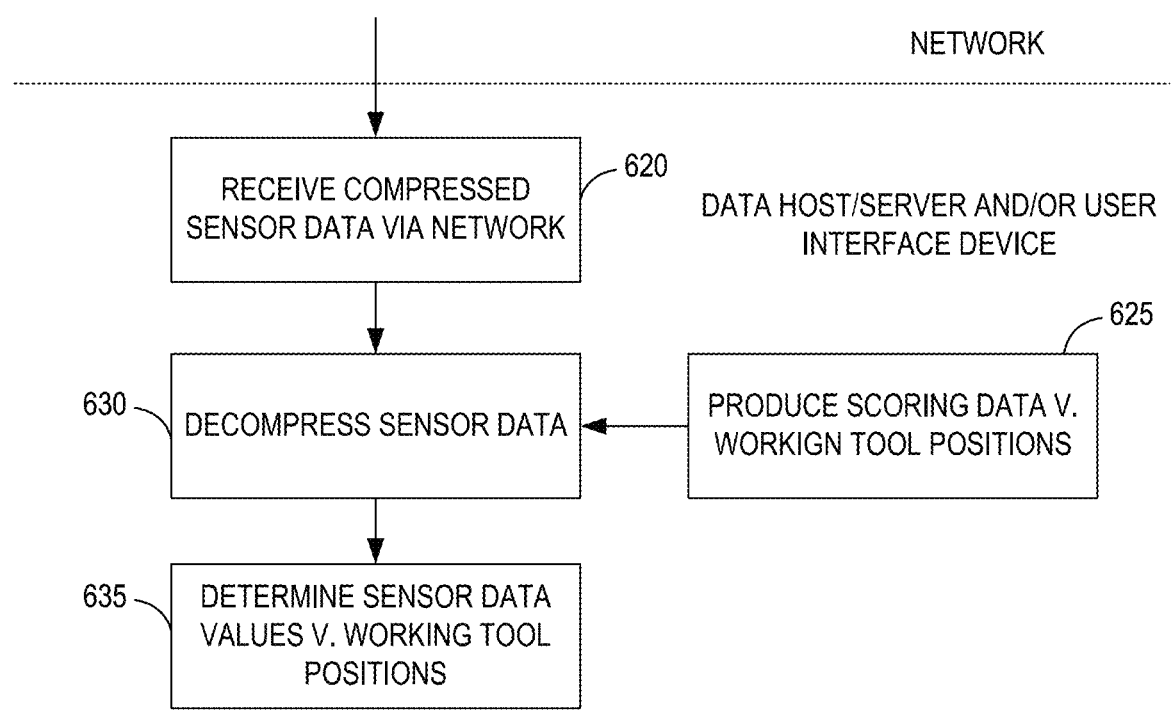

As shown in FIGS. 6A and 6B, in disclosed embodiments, the scoring function may be based on a priori knowledge of the geometry of the part being fabricated so that higher fidelity compression may be applied to particular structures (e.g., corners, edges, and overhangs) during the adaptive compression. In such a case, the scoring function may be derived from process data, rather than a computed magnitude differential. As above, the process includes sampling and digitizing the sensor output streams 510, determining sensor data values v. time 520, retrieving manufacturing process data 530, segmenting the process data into working vectors 540, determining the working tool positions v. time 550, and determining the sensor data values v. working tool positions 560.

Process data, e.g., a CLI file 320 (see FIG. 3), may be processed by a scoring function, (and/or scoring algorithm), to identify structures such as corners, edges, and overhangs (relative to working tool positions). Scoring data relative to working tool positions is produced 605 based on these identifications. The identification of the structures of interest may be determined algorithmically by, for example, calculating whether the working tool path (or a segment of the path) in question is operating in an area where working tool paths in previously-fabricated layers have operated. If there are few or no working tool paths in the previously-fabricated layers (e.g., within a defined number of layers), then the working tool path being analyzed may be overhanging geometry which requires higher fidelity data compression. Other structures, e.g., the edge of the part, also can be detected in an algorithmic manner. The part edges are areas of particular interest because they define the surface roughness, which impacts part quality and/or the amount of post-processing required for finishing parts.

The sensor data is adaptively compressed based on the scoring data 610 as described above, i.e., fidelity of the compression process applied to each portion of the part being fabricated is controlled by corresponding values of the scoring data. The scoring data may be configured so that less complicated portions of the geometry are compressed with less accuracy than the identified complex structures. In disclosed embodiments, each type of identified structure may have a defined weight so that, for example, higher fidelity compression can be used for corners than for edges. The compressed sensor data is transmitted via a network 615.

The compressed sensor data is received via the network by a data host/server 620 and then may be transmitted to a user interface device. The scoring data (relative to working tool positions) can be reproduced 625 at a receiving end using the known scoring function/algorithm and the process data (e.g., the CLI file 320). The scoring data is used to decompress the sensor data 630, as described above. The decompressed sensor data is correlated with the working tool positions to produce sensor data values v. working tool positions 635.

In disclosed embodiments, adaptive compression may be applied to image and video data compared to a two-dimensional correlation reference derived from another measurement, e.g., pyrometry measurements, or from process data, e.g., the CLI file. In either case, a two-dimensional correlation may be performed between an image or frame of video and the two-dimensional reference "image" produced by measurements or process data for a particular layer. Compression techniques which allow for variable compression (and accuracy), such as JPEG, may be used to compress the image and video data based on a computed differential with respect to the two-dimensional reference in a manner akin to the one-dimensional compression performed using Chebyshev polynomials.

Figure 7:
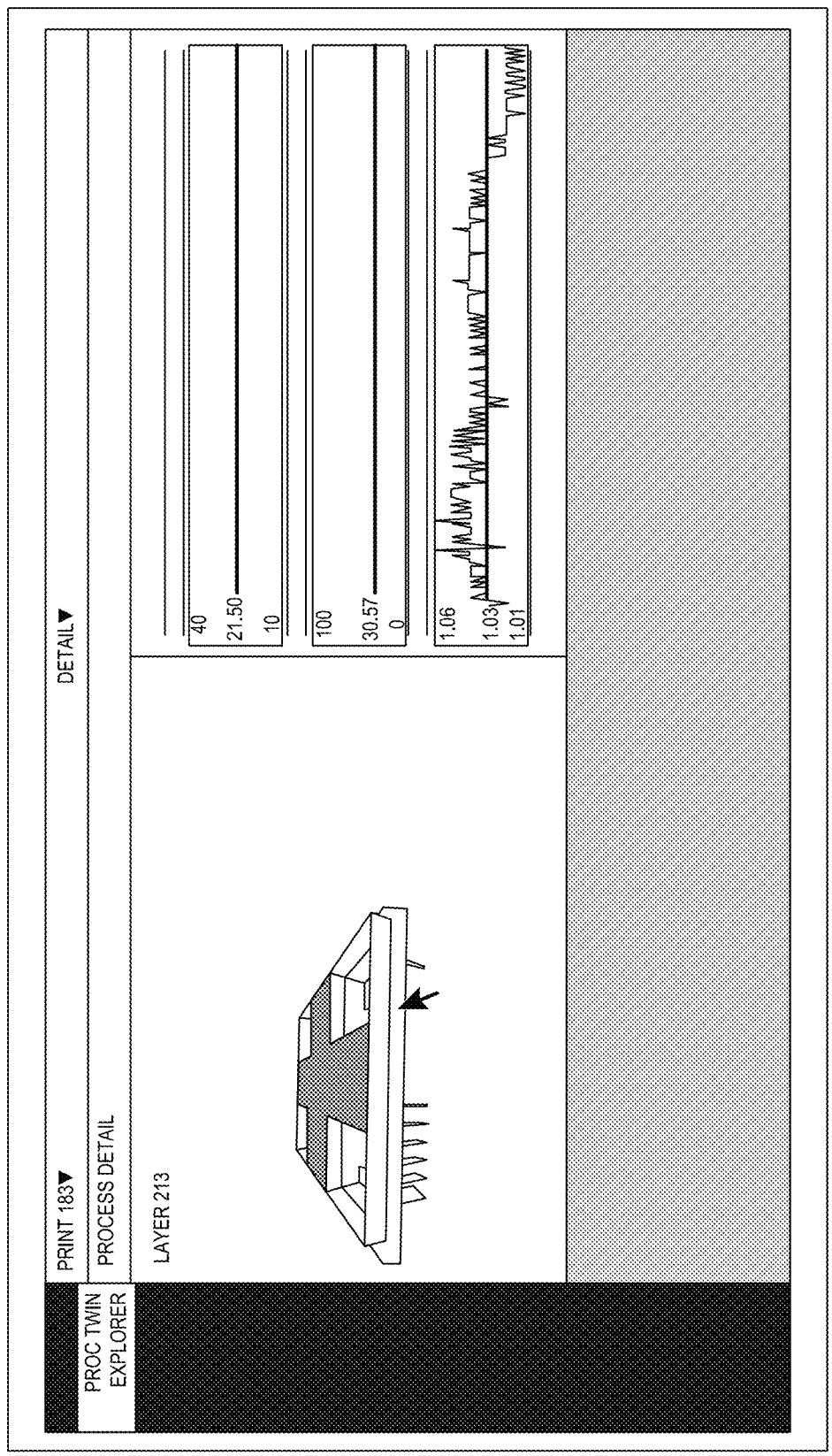
FIG. 7 depicts an example of a user interface screen displaying sensor data for a layer of a part manufactured by a selected machine.

FIG. 7 depicts an example of a user interface screen displaying sensor data for a part manufactured by a selected additive manufacturing machine. A particular machine can be selected by a user, e.g., by making a selection on a menu screen provided by the user interface web app. In disclosed embodiments, the user also selects a specific layer to view (which may be identified by number). The user interface displays an information screen which includes an image of the selected layer of the part, such as, for example, a perspective view of the top and the front edge of the selected layer. The user interface also may display a laser power level, laser beamsize specified for the layer in the process data file, as well as the layer thickness. In addition, the user interface may display, in graphical form, parameters which are subject to change over the course of scanning a layer, such as, for example, ambient temperature, humidity, and laser acceleration.

Figure 8:
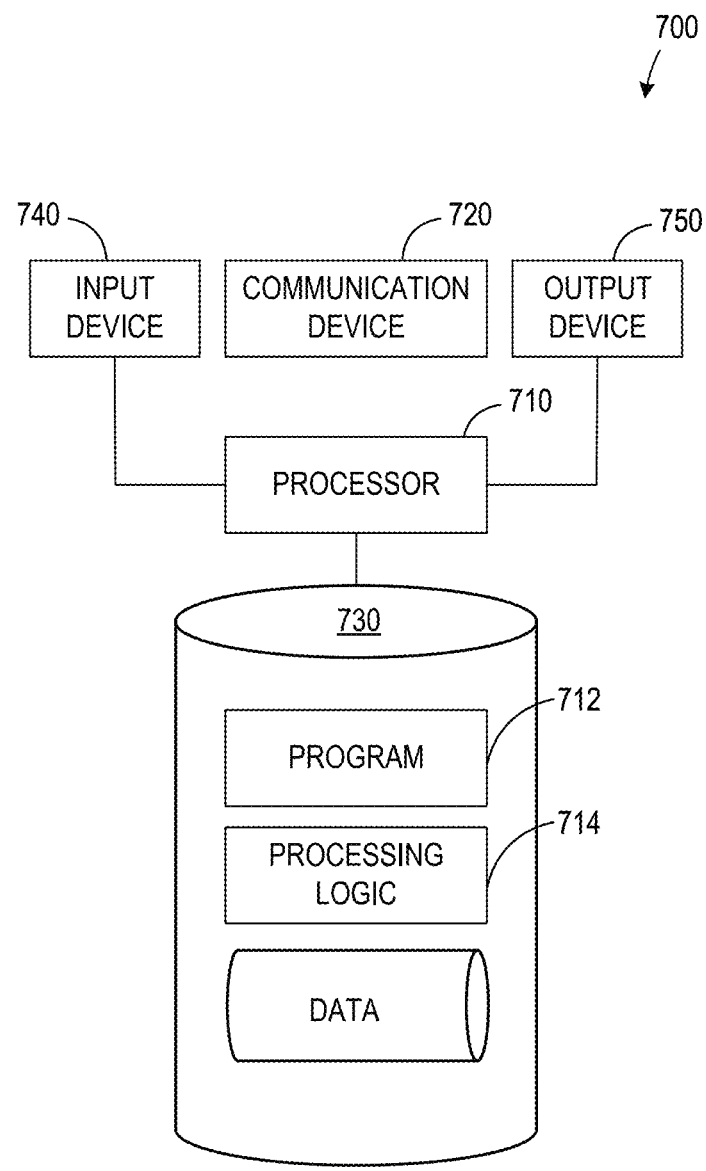
FIG. 8 depicts a processing platform for implementing embodiments described herein.

The embodiments described herein may be implemented using any number of different hardware configurations. For example, FIG. 8 illustrates a processing platform 700 that may be, for example, associated with components of the systems disclosed herein. The processing platform 700 comprises a processor 710, such as one or more commercially available central processing units (CPUs) in the form of one-chip microprocessors, coupled to a communication device 720 configured to communicate via a communication network (not shown). The communication device 720 may be used to communicate, for example, with one or more users. The processing platform 700 further includes an input device 740 (e.g., a mouse and/or keyboard to enter information) and an output device 750.

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or processing logic 714 for controlling the processor 710. The processor 710 performs instructions of the programs 712, 714, and thereby operates in accordance with any of the embodiments described herein. For example, the processor 710 may receive data and then may apply the instructions of the programs 712, 714 to carry out methods disclosed herein.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices. Information may be received by or transmitted to, for example: (i) the platform 700 from another device; or (ii) a software application or module within the platform 700 from another software application, module, or any other source.

It is noted that aggregating data collected from or about multiple industrial assets (e.g., additive manufacturing machines) may enable users to improve operational performance. In an example, an industrial asset may be outfitted with one or more sensors configured to monitor respective ones of an asset's operations or conditions. Such sensors may also monitor the condition of a component part being processed, e.g., manufactured, by the asset. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions. The data analysis also helps to develop better service and repair protocols and to improve manufacturing processes.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function. Such cloud-based systems may be used in conjunction with the message queue-based systems described herein to provide widespread data communication with industrial assets, both new and old.

The flowcharts and/or block diagrams in the figures illustrate the architecture, functionality, and operation of possible implementations of systems, methods and computer program products according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method for receiving and adaptively compressing sensor data for an operating manufacturing machine, the method comprising:
   receiving, at a first server, the sensor data from a sensor for the operating manufacturing machine;
   determining, using a processor of the first server, values of the sensor data relative to time;
   determining, using the processor of the first server, working tool positions relative to time based on process data which controls operation of the manufacturing machine, the process data comprising vectors defining the working tool positions during a manufacturing process;
   determining the sensor data values at the working tool positions based on a correlation of the values of the sensor data relative to time and the working tool positions relative to time;
   determining, with a convolution or cross-correlation operation, a magnitude differential between the sensor data values at the working tool positions and expected magnitude values at the working tool positions, the expected magnitude values included in the process data;
   adaptively compressing the determined sensor data values at the working tool positions based on the magnitude differential; and
   transmitting the compressed data via a network.

2. The method of claim 1, further comprising:
   compressing first sensor data values from the determined sensor data values at the working tool positions with a first compression process;
   compressing second sensor data values from the determined sensor data values at the working tool positions with a second compression process, the second compression process different from the first compression process, wherein a compression process is selected based on the magnitude differential;
   transmitting the compressed first sensor data values at the working tool positions via the network;
   decompressing the transmitted compressed data;
   determining the first sensor data values versus the working tool positions from the decompressed data;
   and outputting the first sensor data values at the working tool positions to an analytic model of the manufacturing machine.

3. The method of claim 2, further comprising:
   receiving, from the analytic model of the manufacturing machine, adjusted process data, the adjusted process data being determined based at least in part on the analytic model and the sensor data values at the working tool positions, the analytic model being based at least in part on a measured characteristic of the manufacturing machine;
   and using the adjusted process data to control the operation of the manufacturing machine.

4. The method of claim 2, wherein:
   the first sensor data values have a first magnitude differential;

the second sensor data values have a second magnitude differential, the second magnitude differential greater than the first magnitude differential;

and the first compression process used in compressing the first sensor data values at the working tool positions is a higher fidelity compression process than the second compression process used in compressing the second sensor data values at the working tool positions.

5. The method of claim 1, further comprising:

correlating, using a processor of a user interface device, a 3D model of a part with the sensor data values at the working tool positions;

and displaying, on a display of the user interface device, the 3D model of the part with a representation of the sensor data values at the working tool positions.

6. The method of claim 1, further comprising:

segmenting, using the processor of the first server, the process data into working vectors and non-working vectors;

and filtering, based on the working vectors, the tool positions relative to time to obtain the working tool positions relative to time.

7. The method of claim 1, wherein the compressed data is transmitted to a second server configured to make the compressed data available to a user interface device.

8. A system for receiving and adaptively compressing sensor data for an operating manufacturing machine, the system comprising:

a first server having a processor configured to perform:
receiving the sensor data from a sensor for the operating manufacturing machine;
determining values of the sensor data relative to time;
determining working tool positions relative to time based on process data which controls operation of the manufacturing machine, the process data comprising vectors defining the working tool positions and corresponding tool control magnitude values;
determining the sensor data values at the working tool positions based on a correlation of the values of the sensor data relative to time and the working tool positions relative to time;
determining, with a convolution or cross-correlation operation, a magnitude differential between the sensor data values at the working tool positions and expected magnitude values at the working tool positions, the expected magnitude values included in the process data;
adaptively compressing the determined sensor data values at the working tool positions for based on the magnitude differential; and
transmitting the compressed data via a network.

9. The system of claim 8, wherein the first server is further configured to perform:

compressing first sensor data values from the determined sensor data values at the working tool positions with a first compression process;

compressing second sensor data values from the determined sensor data values at the working tool positions with a second compression process, the second compression process different from the first compression process, the compression process is selected based on the magnitude differential;

transmitting the compressed first sensor data values at the working tool positions via the network;

the system further comprising: a second server having a processor and configured to perform:

decompressing the transmitted compressed data;

determining the first sensor data values versus the working tool positions from the decompressed data;

and outputting the first sensor data values at the working tool positions to an analytic model of the manufacturing machine.

10. The system of claim 9, wherein the second server is further configured to perform:

receiving, from the analytic model of the manufacturing machine, adjusted process data, the adjusted process data being determined based at least in part on the analytic model and the sensor data values at the working tool positions, the analytic model being based at least in part on a measured characteristic of the manufacturing machine;

and using the adjusted process data to control the operation of the manufacturing machine.

11. The system of claim 9, wherein:

the first sensor data values have a first magnitude differential;

the second sensor data values have a second magnitude differential, the second magnitude differential greater than the first magnitude differential; and the first compression process used in compressing the first sensor data values at the working tool positions is a higher fidelity compression process than the second compression process used in compressing the second sensor data values at the working tool positions.

12. The system of claim 8, further comprising a user interface device comprising a display and a processor configured to perform:

correlating a 3D model of a part with the sensor data values at the working tool positions;

and displaying the 3D model of the part on the display with a representation of the sensor data values at the working tool positions.

13. The system of claim 8, wherein the first server is further configured to perform:

segmenting the process data into working vectors and non-working vectors;

and filtering, based on the working vectors, the tool positions relative to time to obtain the working tool positions relative to time.

14. An apparatus for receiving and adaptively compressing sensor data for an operating manufacturing machine, the apparatus comprising:

at least one memory;

machine readable instructions;

processor circuitry to at least one of instantiate or execute the machine readable instructions to:

receive the sensor data from a sensor for the operating manufacturing machine;

determine values of the sensor data relative to time;

determine working tool positions relative to time based on process data which controls operation of the manufacturing machine, the process data comprising vectors defining the working tool positions during a manufacturing process;

determine the sensor data values at the working tool positions based on a correlation of values of the sensor data relative to time and the working tool positions relative to time;

determine, with a convolution or cross-correlation operation, a magnitude differential between the sensor data values at the working tool positions and expected magnitude values at the working tool positions, the expected magnitude values included in the process data;

adaptively compress the determined sensor data values at the working tool positions based on the magnitude differential; and transmit the compressed sensor data via a network.

* * * * *